(12) United States Patent
Huxley

(10) Patent No.: US 8,788,584 B2
(45) Date of Patent: Jul. 22, 2014

(54) METHODS AND SYSTEMS FOR SHARING PHOTOS IN AN ONLINE PHOTOSESSION

(75) Inventor: Iain Huxley, Sunnyvale, CA (US)

(73) Assignee: Yahoo! Inc., Sunnyvale, CA (US)

(*) Notice: Subject to any disclaimer, the term of this patent is extended or adjusted under 35 U.S.C. 154(b) by 196 days.

(21) Appl. No.: 13/177,510

(22) Filed: Jul. 6, 2011

(65) Prior Publication Data

US 2013/0013699 A1    Jan. 10, 2013

(51) Int. Cl.
   *G06F 15/16*    (2006.01)
(52) U.S. Cl.
   USPC .................... 709/204; 709/206; 709/207
(58) Field of Classification Search
   USPC ............ 709/206, 204, 207, 203; 725/46; 715/771, 738, 753; 707/723, 622, 754; 455/3.06
   See application file for complete search history.

(56) References Cited

U.S. PATENT DOCUMENTS

| | | | |
|---|---|---|---|
| 2003/0097410 A1* | 5/2003 | Atkins et al. | 709/206 |
| 2005/0165888 A1* | 7/2005 | Elliott | 709/203 |
| 2007/0250863 A1* | 10/2007 | Ferguson | 725/46 |
| 2008/0126484 A1 | 5/2008 | Wherry et al. | |
| 2008/0155104 A1 | 6/2008 | Quinn et al. | |
| 2008/0168154 A1 | 7/2008 | Skyrm | |
| 2008/0195962 A1* | 8/2008 | Lin et al. | 715/771 |
| 2010/0017412 A1 | 1/2010 | Horowitz et al. | |
| 2011/0167353 A1* | 7/2011 | Grosz et al. | 715/738 |
| 2012/0215771 A1* | 8/2012 | Steiner | 707/723 |
| 2012/0221520 A1* | 8/2012 | Garrett et al. | 707/622 |
| 2012/0252353 A1* | 10/2012 | Cok et al. | 455/3.06 |
| 2012/0259919 A1* | 10/2012 | Yan et al. | 709/204 |
| 2012/0259927 A1* | 10/2012 | Lockhart | 709/206 |
| 2012/0266084 A1* | 10/2012 | Liao et al. | 715/753 |
| 2012/0290591 A1* | 11/2012 | Flynn et al. | 707/754 |

FOREIGN PATENT DOCUMENTS

| | | |
|---|---|---|
| JP | 2005-149387 A | 6/2005 |
| KR | 10-2008-0026917 A | 3/2008 |

* cited by examiner

*Primary Examiner* — Le H Luu
(74) *Attorney, Agent, or Firm* — Matine Penilla Group, LLP

(57) ABSTRACT

Methods, systems and computer readable medium with program instructions for sharing documents with other users in an online document sharing session include identifying a set of documents to share with viewing users at a document sharing website. The set of documents may have been uploaded onto the document sharing website by a sharing user and selected for sharing in an online document sharing session. One or more viewing users are selected for sharing the documents of the online document sharing session and access information to access the identified documents are provided. The access provides uniform level of control to both the viewing users and the sharing user so as to interact and manage the documents in the online document sharing session. The viewing users and the sharing user access, view and interact with the documents equally and the interactions are gathered and propagated to all the viewing the sharing users in substantial real-time.

22 Claims, 13 Drawing Sheets

METHODS AND SYSTEMS FOR SHARING PHOTOS IN AN ONLINE PHOTOSESSION

BACKGROUND

1. Field of the Invention

The present invention relates to digital photo sessions and more particularly to personalized online photo sessions that is similar to photo viewing in person.

2. Description of the Related Art

Photo sharing has evolved over the years. With the rise in popularity of the internet and digital cameras, photo sharing has changed significantly. The days of getting together and personally sharing photos of events have been replaced by sharing photos online by generating photo sessions that enable the users to upload the photos of an event and inviting other users to view the photos over the Internet. With the online photo session, users are able to enjoy shared viewing while being physically remote.

There are many different photo sharing services that provide users different options and features for making the photo sharing a pleasant and rewarding experience. Currently available photo sharing services provide tools and controls to organize, archive, re-size, publicize and share the photos at various different levels. Some photo sharing services provide tools that are excellent organizers while some others provide tools that are good for editing. Still others are easier to use and navigate around. Majority of these photo sharing services are accessible through mobile devices and provide various levels of customization.

However, there are certain limitations with the online photo sharing services. These photo sharing services provide very limited control for the viewers to manipulate the photo session thereby severely limiting the photo sharing experience. For instance, the photo show is controlled primarily by a master user and the other users are just passive participants who are allowed to just view the photos. In such instances, the other users are unable to control the photo show or actively participate in the photo show. The conventional photo sharing sessions lack the depth or intimacy that is available when sharing photos in person.

It is in this context that the embodiments of the invention arise.

SUMMARY

Embodiments of the present invention describe methods, systems and apparatus for providing an online photo sharing session that closely resembles viewing photos in person. The current embodiments allow all the users that have access to a photo session uniform and advanced controls in managing the photos in the photo session including the ability to control the photo session, annotate, comment, generate online chat, etc. at the photos in the photo show and these annotations, comments and online chats are shared amongst all the users in substantial real-time. The embodiments enable the users to have as close an experience to the personal sharing of photos as possible.

A set of photos are uploaded onto a photo sharing website by a sharing user and one or more viewing users are identified for sharing the photos. Access to the photos are provided to the viewing users so that they can access, view and interact with the one or more photos. The interaction with the photos by the sharing and the viewing users are propagated to all the users participating in the photo session in substantial real-time. The sharing and viewing users have equal and uniform control of the photos in the photo session thereby providing a simple, fun and very personal way of sharing the photos. The current embodiments address the drawbacks of conventional photo sharing services by providing equal and uniform control to all participants in the photo session leading to greater user engagement and interest in the photo session.

It should be appreciated that the present invention can be implemented in numerous ways, such as, methods, systems and an apparatus. Several inventive embodiments of the present invention are described below.

In one embodiment, a method for sharing photos with other users in an online photo session is disclosed. The method includes identifying a set of photos to share with viewing users at a photo sharing website. The set of photos may have been uploaded onto the photo sharing website by a sharing user and selected for sharing in an online photo session. One or more viewing users are selected for sharing the set of photos of the online photo session and access information to access the identified set of photos are provided. The access provides uniform level of control to both the viewing users and the sharing user so as to interact and manage the set of photos in the online photo session. The viewing users and the sharing user access, view and interact with the set of photos in the photo session equally and the interactions are gathered and propagated to all the viewing users and the sharing user in substantial real-time.

In another embodiment, a computer program for sharing photos with other users in an online photo session and embedded in a non-transitory computer-readable storage medium configured to be executed by one or more processors, is disclosed. The computer program includes program instructions for identifying a set of photos to share with viewing users at a photo sharing website. The set of photos may have been uploaded onto the photo sharing website by a sharing user and selected for sharing in an online photo session. The computer program further includes program instructions for selecting one or more viewing users for sharing the set of photos of the online photo session and access information to access the identified photos are provided. The access provides uniform level of control to the viewing users and the sharing user so as to interact and manage the set of photos of the online photo session. The viewing users and the sharing user access, view and interact with the set of photos in the photo session equally. The computer program includes program instructions to gather and propagate the interactions to all the viewing users and the sharing user in substantial real-time.

The embodiments of the invention provide a live, shared photo slide show, where multiple users can flick through a set of photos, and enables all the users to follow the photo show. As one set of users switch photos, zoom in on a photo, tag as favorites, etc., the remaining set of users see the changes live. The users are able to draw on the pictures, annotate, provide comments, etc. The tool provides a simple, fun, and personal way to share the pictures remotely over the internet that closely relates to the experience of going through a photo album in person. The viewing users have the same ability to access, control, view and interact with the photos as the sharing user making it a robust photo sharing tool.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIGS. 4c-1 and 4c-2 illustrate an exemplary screen shots of the photo illustrated in FIG. 4a along with annotations provided by the one or more viewing and sharing users during an online photo session, in one embodiment of the invention.

DETAILED DESCRIPTION

Figure 1:
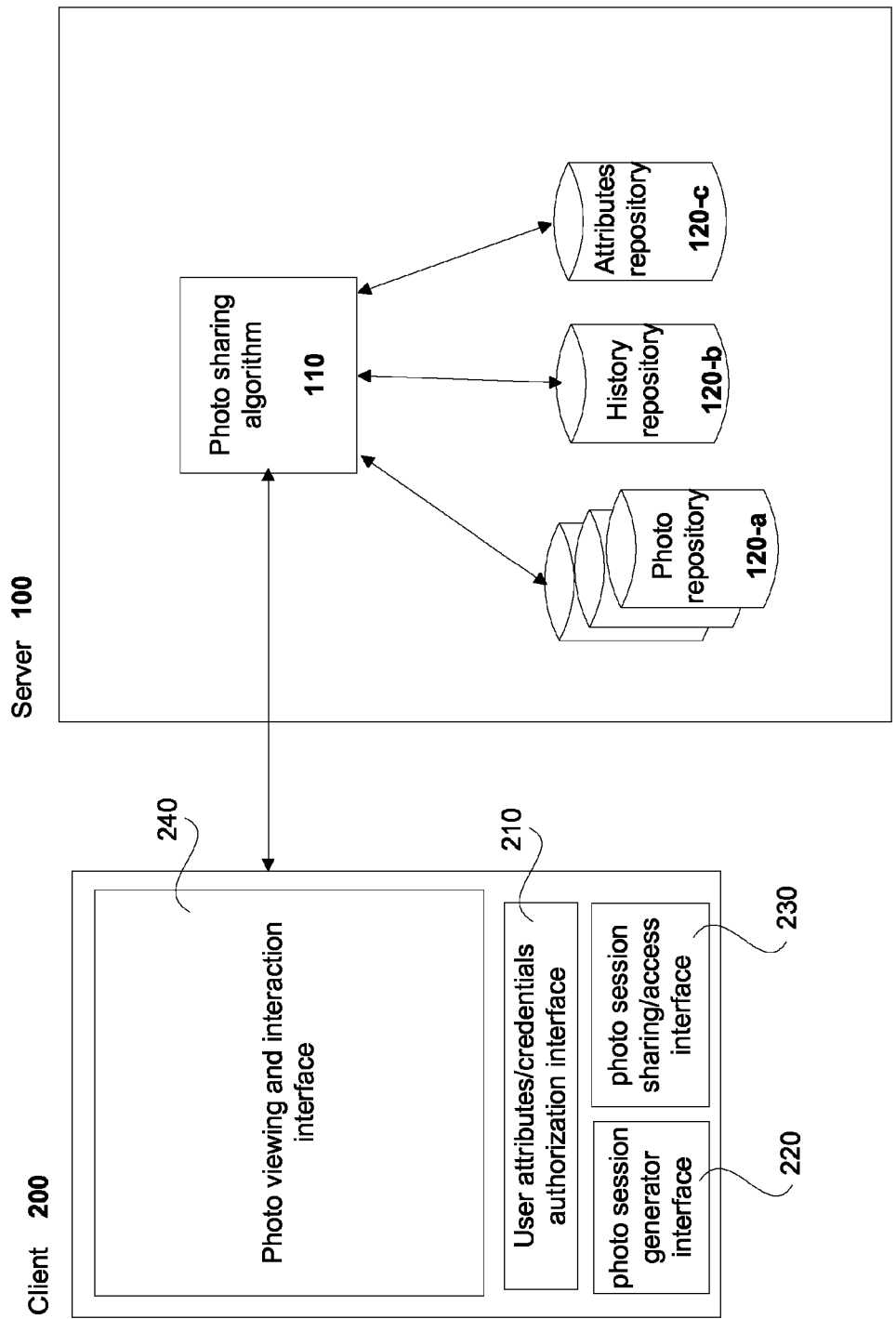
FIG. 1 illustrates a simplified block diagram of a system used for sharing photos with other users in on online photo session, in one embodiment of the invention.

Broadly speaking, the embodiments of the present invention provide methods, systems and computer algorithm within a computer readable medium for sharing photos with other users in an online photo session. A set of photos uploaded on to a photo sharing website is identified by a sharing user for sharing with one or more viewing users. The sharing user provides access to the identified set of photos to the viewing users and the viewing users access the photos in a seamless manner. Upon accessing the photos, the viewing users and the sharing user are able to interact with the photos by viewing the photos, commenting on the photos, zooming in/out photos, annotating, etc. Any changes or interactions done by any of the users are shared with other users in substantial real-time. Each user of the online photo session is provided equal and uniform level of control and no single user controls the entire online photo session. The algorithm, in this embodiment, also provides a host of the online photo session additional capabilities, such as ending the photo session, removing a particular user from the online photo session, etc. Host, as used in this embodiment, is a user that initiates the photo session by uploading the photos, identifying a set of users to join the online photo session, and inviting the other users to join the online photo session by providing the link to the online photo session to the other users. The algorithm, thus, addresses some of the drawbacks of conventional application.

Conventional applications provide a photo sharing experience that heavily relies on a master controller (i.e. a user) that controlled the online photo session and provided the viewing users very little to no control. For instance, the conventional setup allowed users to just view the pictures and severely curtailed the role of the viewing users thereby resulting in a less than satisfying photo viewing experience for the viewing users. The embodiments of the current invention, on the other hand, provides uniform level of control to all the users that have access to the online photo session thereby providing a simple, fun and a more involved personal photo viewing experience to all users even when the users are remotely located.

In one embodiment, different levels of control may be provided to different users to allow various levels of freedom. The different levels of control may be needed to control and manage the changes made to the photos during the online photo session. The different levels might be needed when a large number of users may be viewing the photo session and providing comments, annotations, etc. Even though the users have different levels of control, it should be noted that the users still have the ability to exercise some level of shared control of the online photo session. The embodiments enable a user to have a rich photo sharing experience enhancing users' engagement and interest. Although the various embodiments of the application extensively talk about online photo sharing, the teachings of the current embodiments are not restricted to photo sharing but may be extended to online sharing of any other documents.

The embodiments of the invention can also be extended to browsing and online sharing of video or audio files. In the case of video or audio files, when a user wants to share a streaming video in a Flickr stream or any other video/audio sharing streams, they can invite other users and share the viewing of the video/audio stream. The users can start a chat session while the video/audio file is streaming, pause the audio/video stream, share comments, draw on the video, etc.

With the general understanding of the invention, specific embodiments will now be discussed with reference to the attached drawings. FIG. 1 illustrates a system for sharing photos with other users in an online photo session. An algorithm, such as a sharing algorithm 110, executing on a server 100 allows users to initiate an online photo session and invite other users for sharing photos. The algorithm identifies a set of photos that a sharing user wants to share and one or more viewing users to share the photos with and initiates the online photo session from a client 200. The client 200 includes a user attributes and credentials authorization interface 210 to enable a user to access the photo sessions. The sharing user may generate a new photo session using a photo session generator interface 220 and extend an invitation to other users to view the newly generated or previously generated online photo session by providing a link to the appropriate photo session. The link may include a uniform resource locator (URL) of the photo session and, in one embodiment, the viewing user clicks on the link using a photo session access interface 230 to join the photo session.

The photos may have been previously uploaded by the sharing user onto a photo sharing website, such as Flickr, SmugMug, etc., and may be stored in a database, such as a photo repository, available to the algorithm 110 on the server 100. In one embodiment, the URL link to the online session may be provided through any one of email, short message service (SMS) text, instant message, phone call, etc. When the viewing users access the URL through the provided link, the algorithm presents the set of photos related to the online photo session. The algorithm uses the user attributes of the viewing users and attributes of the photo session provided in the link to extract the appropriate set of photos from the photo repository 120-a, package and present to the viewing users for viewing and commenting at the photo viewing interface 240. The algorithm further determines what additional information the sharing user is interested and willing to share with the viewing users, extracts the additional information from a history repository 120-b and presents the additional information along with the set of photos based on the determination. In one embodiment, the additional information may include comments/annotations/message chats, etc., associated with the set of photos. For instance, the set of photos of the online photo session may have already been viewed by a group of users (i.e. viewing and sharing users) and may have comments and annotations associated with it. The comments, annotations and message chats from the previous photo session are stored in the history repository 120-b using any one or more of session attributes, user attributes, spatial attributes and/or temporal attributes for subsequent retrieval and analysis. In one embodiment, the spatial attributes may be related to the photos or the users sharing the online photo session. The sharing user may be interested in sharing just the photos or the photos with the annotations, comments and message chats from selected ones or all of the previous photo sessions with the viewing users. In response to the sharing user's interest for sharing the information for the online photo session, the algorithm extracts the appropriate information related to the annotations/comments/message chats of the previous photo session from the historical data using the session, user, spatial and/or temporal attributes, packages the information with the set of photos and presents the packaged information to the second set of viewing users for viewing and commenting.

In one embodiment, the algorithm may use the concept of overlay in identifying and presenting the information with the set of photos in the online photo session. In one embodiment, the original set of photos may be stored as a distinct photo file in a database, such as photo repository 120-a, available to the server. The generated information from previous photo sessions are also stored as distinct files in the database, such as history repository 120-b, accessible to the algorithm 110. The generated information from each of the photo sessions may be stored in the history repository 120-b as distinct files using session, user, and/or temporal parameters that is different from the session, user and/or temporal parameters of the initial photo session or may be stored with the same session, user and/or temporal parameters of the initial online photo session. Irrespective of how the generated information is saved in the history repository, the generated information from each of the historical photo sessions is mapped to the initial photo file in the photo repository 120-a. The user, session, spatial and temporal attributes may be stored in an attributes repository 120-c that is made available to the sharing algorithm 110 executing on the server 100. In one embodiment, the photo repository 120-a, history repository 120-b and attributes repository 120-c may all be integrated into a single database.

When a sharing user wants to share the online photo session with a second set of users, the sharing user initiates the online photo session and invites the second set of users to view and comment. A link to the photo session is provided to the second set of viewing users. The sharing user may be any one of the sharing or viewing users from the initial online photo session. The algorithm determines the type and amount of information the sharing user is willing to share, and based on the determination extracts and presents the requested information to both the sharing and the second set of viewing users for viewing and interacting. In one embodiment, the sharing user decides to share a photo session with a set of viewing users, the algorithm may identify and present a list of photo sessions associated The sharing user and/or the second set of users may generate comments, annotations and/or message chats related to the one or more of the rendered photos of the online photo session, and the newly generated information from the second set of users and/or sharing user are stored in the history repository 120-b for subsequent retrieval and analysis. The generated information is also mapped to the original online photo session so that the information can be easily retrieved for presentation and analysis. Additional users may be added during the online photo session or invited to subsequent online photo sessions in which case the newly added/invited users are provided with access to select ones or all of the comments, annotations and message chats that are available for the set of photos in the photo session. The process of sharing the photo session with additional users may continue so long as the sharing user is interested in sharing the photo session.

In one embodiment, when the sharing user selects new viewing users for sharing the online photo session, the algorithm determines what information the sharing user wants to expose and share with the new viewing users and provides appropriate information associated with the set of photos as overlays so that the new viewing users can view and interact with the photos based on the presented information accompanying the photos. For instance, the sharing user may be interested in sharing just the photos from the original photo session with the new viewing users. In this case, the new viewing users may receive link associated with only the photos from the original photo session to enable the new viewing users to join and participate in the online photo session. In another instance, the sharing user may be interested in sharing the photos from the original photo session and also information from one of a first set of generated information, a second set of generated information, etc., or from all sets of generated information. In this instance, depending on the amount of information the sharing users are willing to share with the new viewing users, the new viewing users will be presented with a link to the photos from the original photo session that is overlaid with one of a first set of generated information from an initial shared photo session, a second set of generated information from a second shared photo session, etc., or generated information from all the shared sessions. To accommodate overlaying of selective information, the algorithm may store the generated information from each photo session separately so that selective extracting of the information can be effectuated. Subsequently, if either a viewing user or a sharing user wants to share the photo session with other users, the user simply provides the link to the appropriate information to the subsequent user/set of users and the algorithm presents the appropriate information with the set of photos. The algorithm, thus, provides great flexibility to the sharing and viewing users for sharing the set of photos and the generated information.

In one embodiment, the system may use a light weight message system for enabling message chats amongst the users during the photo session. In one embodiment, a set of editing tools may be available to enable the users to comment, draw, annotate, or message/video chat. The editing tools may include tools for text editing, image editing, text/image display, etc.

Figure 2A:
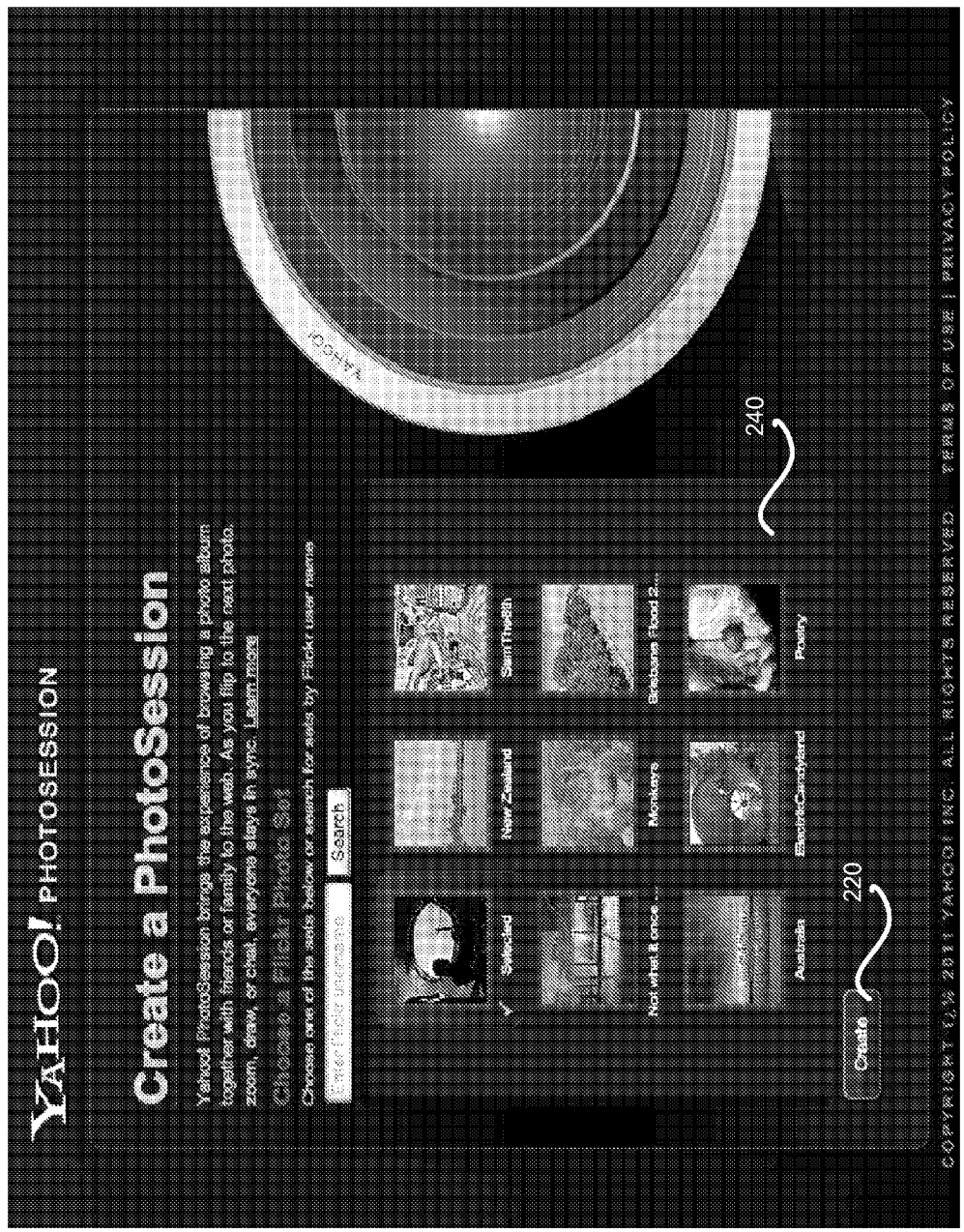
FIG. 2a illustrates an exemplary screen shot of an online photo session creation screen, in one embodiment of the invention.

With the general understanding of the system configuration, FIGS. 2a-2c will now be described in greater detail. FIG. 2a illustrates an exemplary photo session creation screen with available options for a sharing user to initiate sharing of the photo session with viewing users, in one embodiment of the invention. The photo session creation screen may be an initial "landing" page that the sharing user is presented when accessing the application executing the algorithm, in one embodiment of the invention. The algorithm may present distinct sets of photos that are available to the sharing user for sharing with other users. In one embodiment, the distinct sets of photos may have been previously uploaded by the sharing user and are currently available for viewing. In another embodiment, the distinct sets of photos may have been uploaded by other users and the sharing user has access for sharing the photos. In yet another embodiment, the distinct sets of photos may identify the most recently viewed photos by the sharing user and may include photos uploaded by both the sharing user and other users. In one embodiment, when the sharing user accesses the screen with an intention of sharing a particular set of photos, the algorithm may mine the photo repository to identify and present a list of various sessions associated with the particular set of photos and presents the list to the sharing user to select and share. In one embodiment, the algorithm may mine the historical data to select all the photo sessions featuring the set of photos based on certain user, temporal, temporal or session attributes and present the mined data to the sharing user for sharing with the viewing users. The historical data mining may result in identifying the photo sessions in which a particular viewing user has commented, the particular user is featured and/or the particular user captured, and present the list based on the mined historical data. The list of photo sessions provides the sharing user with the ability to determine the likes and interest of the particular viewing user. For instance, if user 1 was interested in dogs and commented on dogs or captured pictures with dogs in them, then the sharing user who shared the session with user 1 can determine the user 1's interest based on this analysis. The user can filter the presented list based on sessions, people, commentary, content, etc., and select the photo session that the user wants to share. The presented list may also be filtered to perform similarity analysis to determine users likes and dislikes, favorites, etc. The sharing user selects and initiates a photo session from the list based on what information the sharing user wants to share and invites a set of viewing users.

In addition to automatically presenting a list of photo sessions, the algorithm may also provide the ability to search sets of photos uploaded and/or shared by any of the users including the sharing user. In one embodiment, the sharing user may have been a viewing user to an earlier photo session shared by a different sharing user. In this embodiment, the algorithm provides the sharing user with the ability to search the historical data to identify an earlier photo session uploaded by a particular viewing users and invite a new set of users to view and comment.

In addition to the distinct sets of photos available to the sharing user, the algorithm provides the sharing user with the ability to upload photos and create a new photo session. In one exemplary embodiment, the algorithm provides a create button, as illustrated on the screen in FIG. 2a. The embodiments are not restricted to creating photo session using the exemplary embodiment and that other forms for uploading photos and creating photo sessions are also possible. For instance, in one embodiment, a sharing user may be able to create a photo session based on a selected photo or group of photos residing on the user's mobile device or a local disk of a system associated with the user. In this embodiment, the sharing user is able to use the selected photo(s) to create the photo session. In response to the create photo session command, the algorithm may upload the selected photo(s) to a server so as to enable the sharing user to share the link to the selected photos on the server with other users.

Figure 2B:
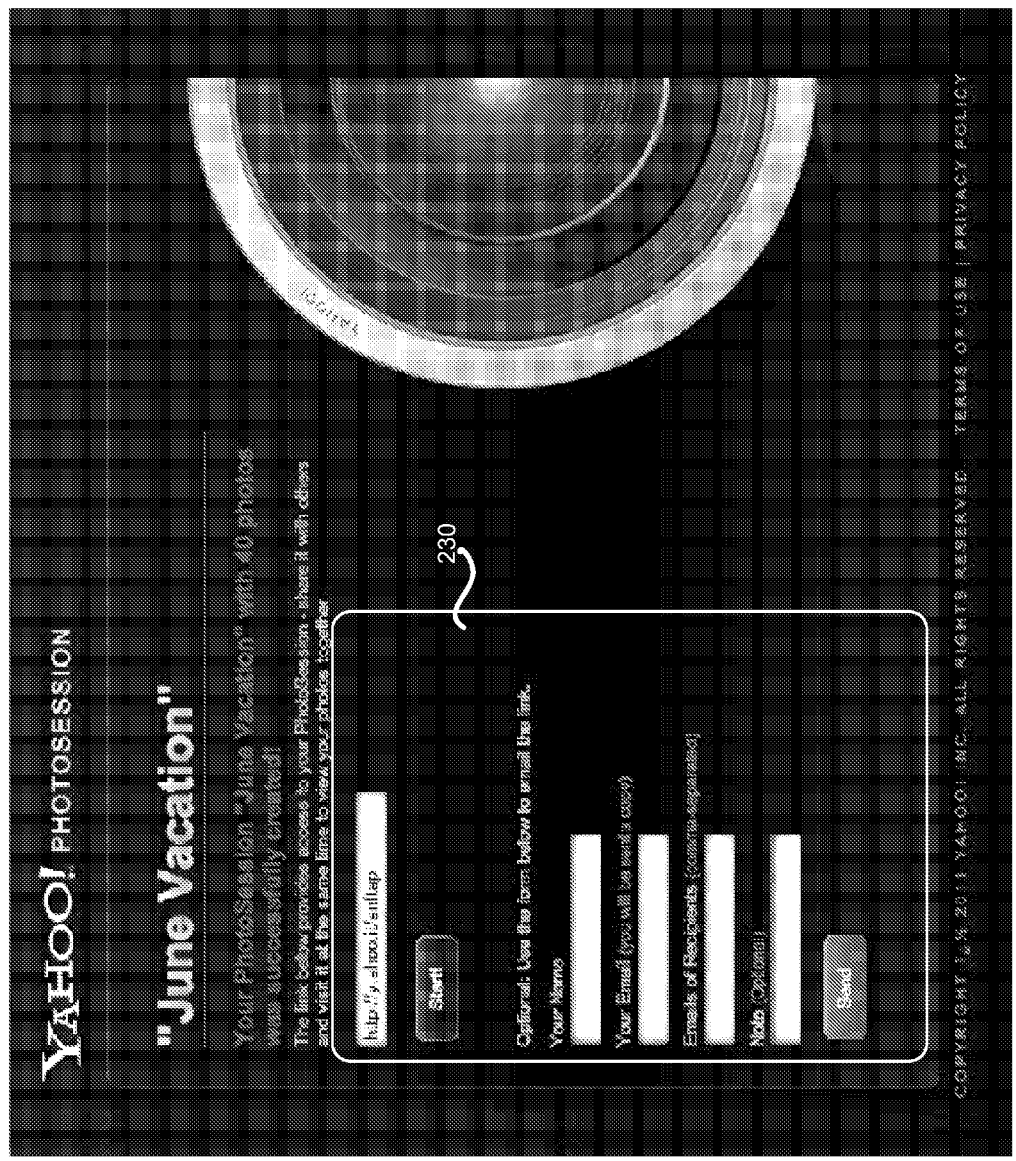
FIG. 2b illustrates an exemplary screen shot of an online photo session sharing screen, in one embodiment of the invention.
Figure 2C:
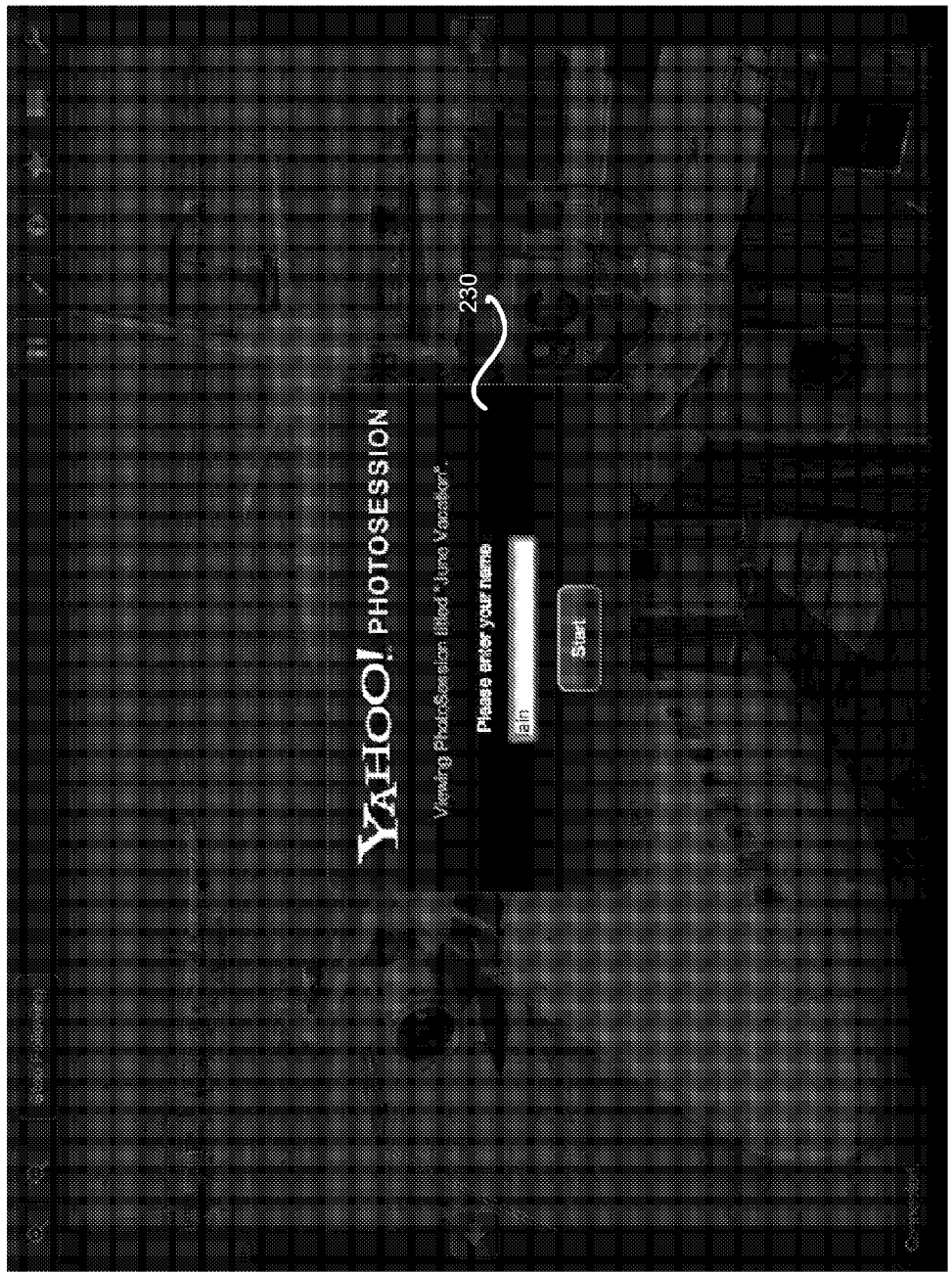
FIG. 2c illustrates an exemplary screen shot of an user sign-on screen to access the online photo session, in one embodiment of the invention.

FIG. 2b illustrates a sharing screen for accessing a photo session and inviting other viewers to share the photos in the photo session, in one exemplary embodiment of the invention. Upon uploading the photos for sharing, the sharing user may be presented with this sharing screen to enable the sharing user to invite other users and to provide a link to the photo session. In one embodiment, the algorithm provides the ability for the sharing user to start the photo session and invite as many viewing users as the sharing user wants to share the photo session. In one embodiment, the algorithm provides the sharing user with the ability to schedule a meeting time for the online photo session and such information may be provided in the link to the photo session. In one embodiment, the scheduled meeting time provided by the sharing user may be used by the algorithm to update an online calendar of the respective viewing users to add an event entry for the online photo session so that the viewing users may be reminded of the scheduled photo session. The algorithm includes an event scheduler interface to interact with the online calendar tool so as to be able to generate the event entry in the calendar tool. In one embodiment, the online calendar tool may encompass Microsoft Outlook® or iCal® from Apple, inc. It should be understood that the aforementioned list of online calendar tool is exemplary and should not be considered restrictive. As a result, the event scheduler interface may interact with other event entry tools associated with a viewing user and a sharing user to generate an event entry for the online photo session.

The viewing user receives the link and logs into the online photo session using user attributes. FIG. 2c illustrates an exemplary sign-on screen for logging into the photo session. When a viewing user accesses the link, the user may be able to directly access the set of photos in the photo session or may have to undergo authentication before being allowed to access the set of photos. In one embodiment, the algorithm may determine the type of authentication required for accessing a particular photo session based on the specifications provided by the sharing user and present the user sign-on screen for authenticating a viewing user accordingly. The sharing user, while creating the photo session for a set of photos may specify the requirements for accessing the photo session including any special authentication required for accessing the photo session. In one embodiment, the algorithm may just require a viewing user's name or other identifier to sign on to the photo session. In another embodiment, additional user attributes may be required to authenticate the user. The algorithm authenticates the user using the user attributes provided during the sign-on before allowing the user to access the photo session. Upon successful authentication or verification of user credentials, the viewing users are allowed to participate in the photo session. In one embodiment, the algorithm may provide a default sign-on attributes with the option of being able to change the sign-on attributes upon successfully logging in to the photo session. Once authenticated, the viewing users have the same level of control as the sharing user.

In one embodiment, the sharing user may have specified different levels of access to different viewing users. The different levels of access may be due to the sheer number of viewing users that are invited to share the photo session. The different levels of access may be defined to control changes to the photos in the photo session due to the number of viewing users accessing the photo session. In one embodiment, the different levels of access may be defined based on a relationship between the sharing user and the viewing user or based on a certain hierarchy. In one embodiment, the sharing user may control the changes by inviting the viewing users from a single specific level to participate in the online photo session at any given time. The viewing users, upon successful authentication, participate in the online photo session with the same level of control as all the users.

Upon successfully logging into the photo session, the users comment, annotate or message chat on the photos. In one embodiment, a sharing user and a viewing user may start a photo sharing session and start to chat/annotate. Subsequently, when a third user joins the photo session, the third user is able to access the chats/comments/annotations that the sharing user and viewing user generated and may be able to generate his/her own comments/annotations/chats. The third user may participate in the photo session using a "play" button. In one embodiment, the play option may provide animation of the chats/annotations/comments between the sharing and viewing users so that the third user can review all the generated information. During the animation, the third user may pause the session and provide his/her own comments and the third user's comments are shared with the sharing and viewing users in substantial real-time.

In another embodiment, the third user may access the photo session that the sharing and viewing user were part of and participate in the photo session using an "Autoplay" option. The autoplay option allows the third user to receive the shared session information including any and all generated information, view the generated information and add his/her own comments. Since the sharing and viewing users are not currently participating in the photo session, the newly generated comments from the third user may be transmitted to the sharing and viewing users to let them know that a third user has viewed and commented on one or more of the photos in the photo session. This option provides the viewing and sharing users to be kept informed even after they have exited the photo session. In one embodiment, a user may select a "presenter" or "host" mode option to take control of the slide show within the online photo session. In this embodiment, the host user may be any one of the sharing user or viewing users that participate in the online photo session and is provided with greater capabilities to control the online photo session. For instance, using this option, the host user has the ability to singly control the slide show of the online photo session including terminating the photo session, removing a user from the list of users participating in the photo session, etc.

Figure 3A:
FIG. 3a illustrates an exemplary screen shot of a photo of an online photo session accessed from a photo sharing website, in one embodiment of the invention.

FIGS. 3a-3d illustrate various features available during the online photo session, in various embodiments of the invention. FIG. 3a illustrates a photo from a photo show within the photo session that viewing or sharing users are currently viewing upon successfully accessing the photo session. In addition to providing access to the photos for viewing, the sharing algorithm also provides editing tools for the users to use for commenting, annotating, etc. In one embodiment, the algorithm provides standard editing tools for all the viewing users to use when interacting in the photo session. The standard editing tools provide users means to enter the comments, annotations, etc., at each of the photos in the photo session. The comments/annotations are captured as changes and the algorithm stores these changes as overlay data for the original photos in a history repository. The algorithm may use session attributes, user attributes, spatial attributes and/or temporal attributes to store the changes in a database for subsequent retrieval/analysis. In addition to the editing tools the algorithm may also provide a light weight messaging tool to allow the users to chat during the online photo session. In one embodiment, additional native editing tools from different applications may be integrated with the standard tools to enable the users to launch appropriate editing tools to better interact with the photos/images in the photo session.

Although the various embodiments have been described with reference to sharing photos, it should be noted that the current embodiments of the algorithm may be extended to include sharing other documents in an interactive document sharing session and advanced native editing tools may be used to provide comments/annotations on the shared documents. For instance, a contractor may share a blue print for a building with one or more architects and the advanced native editing tools may be helpful in interacting with the blue prints. For instance, native editing tools from powerpoint may be integrated with the standard editing tools so that the users may be able to launch the native editing tools when providing comments to a powerpoint document. The comments/annotations are captured through the metadata which is stored in the history repository and mapped to the original online photo session for subsequent mining and analysis.

Referring back to FIG. 3a, some of the standard tools that are available to the users during the online session may include text and image editing tools 310, such as a pencil tool for drawing, an information box for providing additional information, a comment box, and set-up tool, and a viewing tool, such as zoom in/out tool 315. In addition to the editing and viewing tools (310, 315), the algorithm also provides a "Stop Following" button/tool which will be discussed in detail with reference to FIG. 4d. The aforementioned tools are exemplary and should not be considered limiting. Consequently, more or less tools may be provided for editing/commenting on photos during the photo session as deemed fit. In addition to the aforementioned tools, the algorithm also provides a pause button. In one embodiment, when a viewing or sharing user wants to comment/annotate a particular photo in the photo show during the photo session, the user temporarily pauses the photo show using the pause button and provides his/her comments or annotations. Upon completion of the comments/annotations, the user resumes the photo show. In one embodiment, the pausing and resuming of the photo show may be initiated by two different users. For instance, viewing user 1 may pause the photo show to provide comment on a particular photo and viewing user 2 or the sharing user may un-pause (i.e. resume) the photo show and continue with the photo show. In another embodiment, the viewing or sharing user is able to comment/annotate a particular photo during the photo show without using the pause button to pause the photo show. The generated comments/annotations are made available to the remaining users participating in the photo session in substantial real-time. In one embodiment, the user uses the pause button within the editing tool 310 to both pause and un-pause the photo show. In another embodiment, two different buttons may be provided for pausing and un-pausing.

In one embodiment, the user may select an editing tool 310, such as the pencil tool, the note tool or the comment tool, to provide comments/annotations. The algorithm recognizes the selection of the editing tool and automatically pauses the photo show. Upon completion of the comments/annotations, the algorithm automatically releases the hold on the photo show and allows the photo session to continue. In one embodiment, after the algorithm has paused the photo show based on user selection of the editing tool, a viewing or sharing user may manually over-ride the pause by selecting the pause button to un-pause and resume the photo show. The comments/annotations are stored in a database, such as history repository, for subsequent retrieval. In one embodiment, the generated comments/annotations are mapped to the photo in the photo show using a tag. In another embodiment, the generated comments/annotations are mapped to a specific feature, content or portion of the photo within the photo show. For instance, when a user wants to comment or annotate, the user clicks on the particular photo or particular feature of the photo and a pop-up window may be rendered where the comments/annotations are provided by the user. When the user has completed generating his/her comments/annotations, the generated information is tagged to the particular photo/feature/content/location of the photo. The generated information is stored in the history database with the tag. Thus, when the sharing user wishes to share the comment/annotation information with other users, the generated information is extracted from the history database and overlaid on the original photos and presented to the users that were invited for viewing the photos.

Figure 3B:
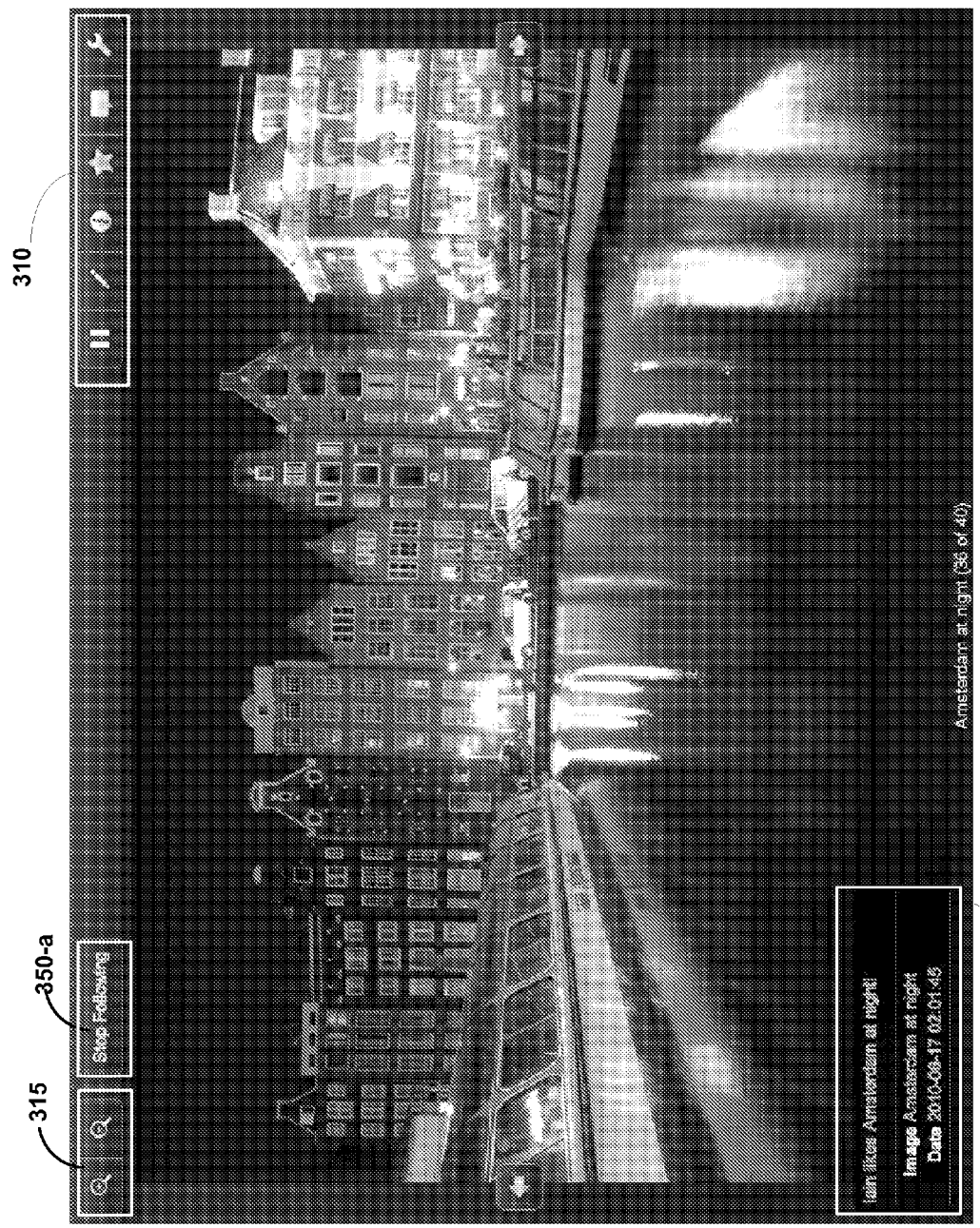
FIG. 3b illustrates an exemplary screen shot of photo sharing tools available to the online photo session, in one embodiment of the invention.

FIG. 3b illustrates an exemplary screen shot of the photo selected for viewing, in one embodiment of the invention. As illustrated, an informative note 320 may be added to the photo using a note tool to provide additional information on the photo. The note may be provided by the sharing user as additional information for sharing with the viewing users. In addition to the informative note 320 provided by the sharing user, the algorithm may analyze the data associated with the photo and provide results of the analysis for all users to view. For instance, as illustrated, the algorithm may analyze the photos and generate the sharing user's favorites or "likes" as can be seen by the comment, "Ian likes Amsterdam at night". In one embodiment, the algorithm may generate the sharing user's favorite list of photos based on some user action provided by the sharing user. The user action, in this embodiment, is indicative of the sharing user's likes or interest. For instance, the sharing user may select a "like" button provided by the algorithm, while viewing a specific photo in the photo session and the algorithm may register such user actions in a history repository associated with the specific photo and use such actions to identify the specific photo to generate the sharing user's favorite list of photos.

Figure 4A:
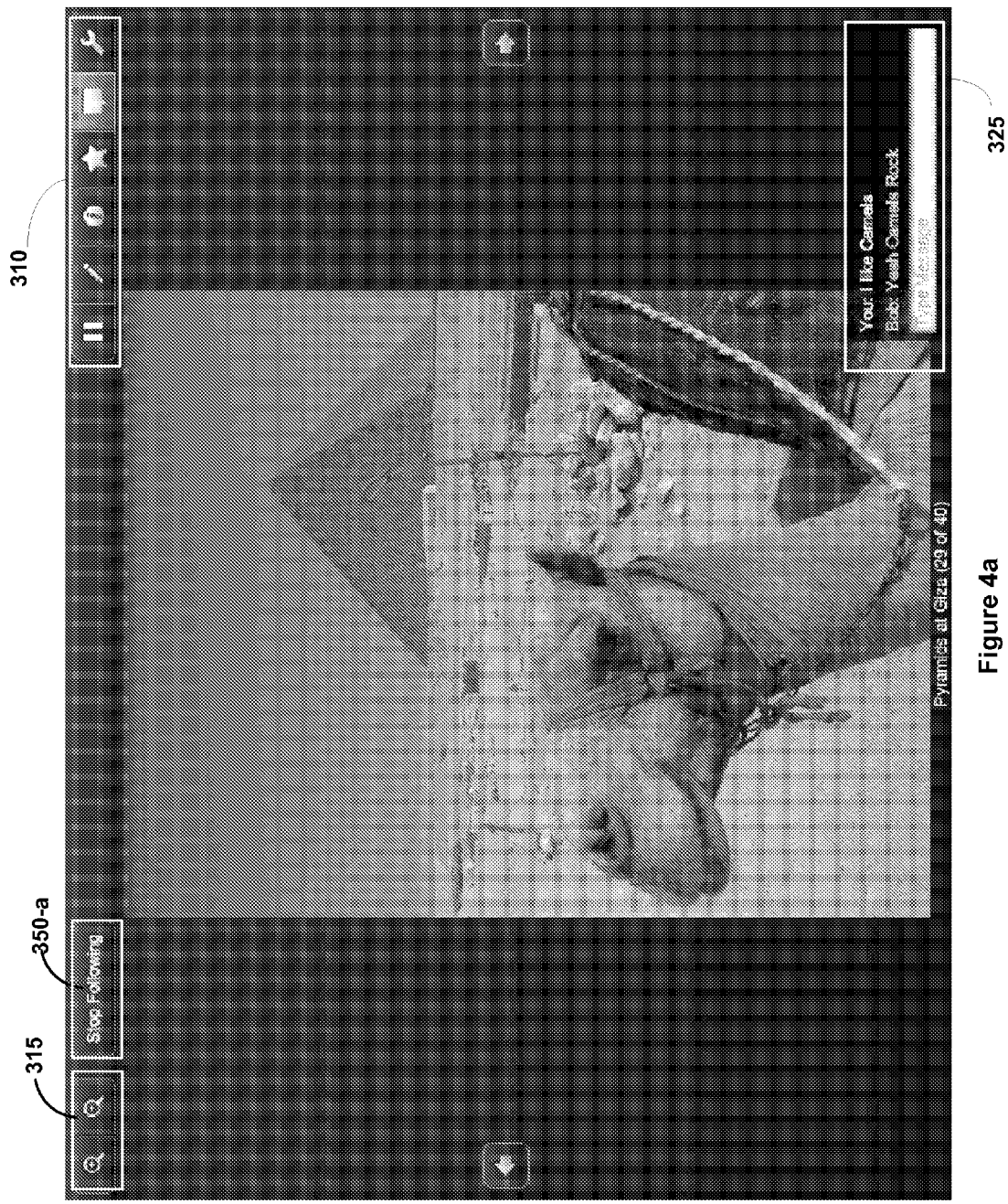
FIG. 4a illustrates an exemplary screen shot of a photo viewed by the viewing and sharing users during an online photo session, in one embodiment of the invention.

FIGS. 4a-4d illustrate other features available during the photo session. As illustrated in FIG. 4a, a light-weight messaging tool may be provided for the participating users to hold live chat. The messaging tool, when activated, provides a message chat window 325 for the users to use during the photo session. The messaging tool enables the participating users to comment on the photos in the photo show in the window and these comments are available to all the remaining participating users in substantial real-time. In one embodiment, the message chats are associated with a particular photo of the photo show. In another embodiment, the message chats are not associated with any particular photo, instead, the algorithm may present the chat window 325 and map it to the photo show.

Figure 4B:
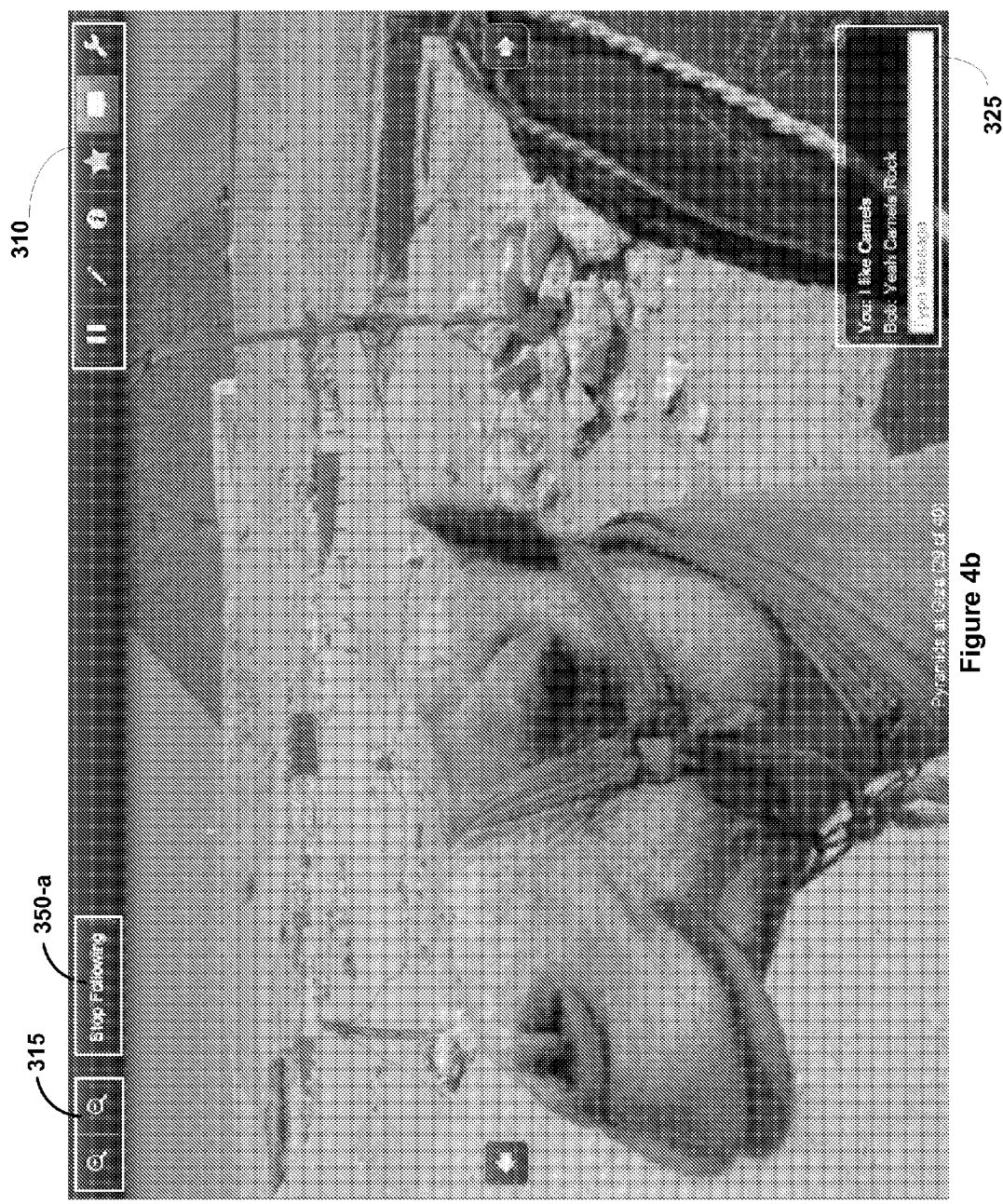
FIG. 4b illustrates a zoomed photo illustrated in FIG. 4a using photo sharing tools, as viewed by the viewing and sharing users during an online photo session, in one embodiment of the invention.

FIG. 4b illustrates the results of using the viewing tools 315 by the users to view the photos in the photo session. The zoom in option within the viewing tools 315 helps the viewing and/or sharing users to zoom in and view/comment on the pictures. As can be seen, the message chat window 325 is available to the users during the time the viewing tools are selected.

Figures 1, 4C:
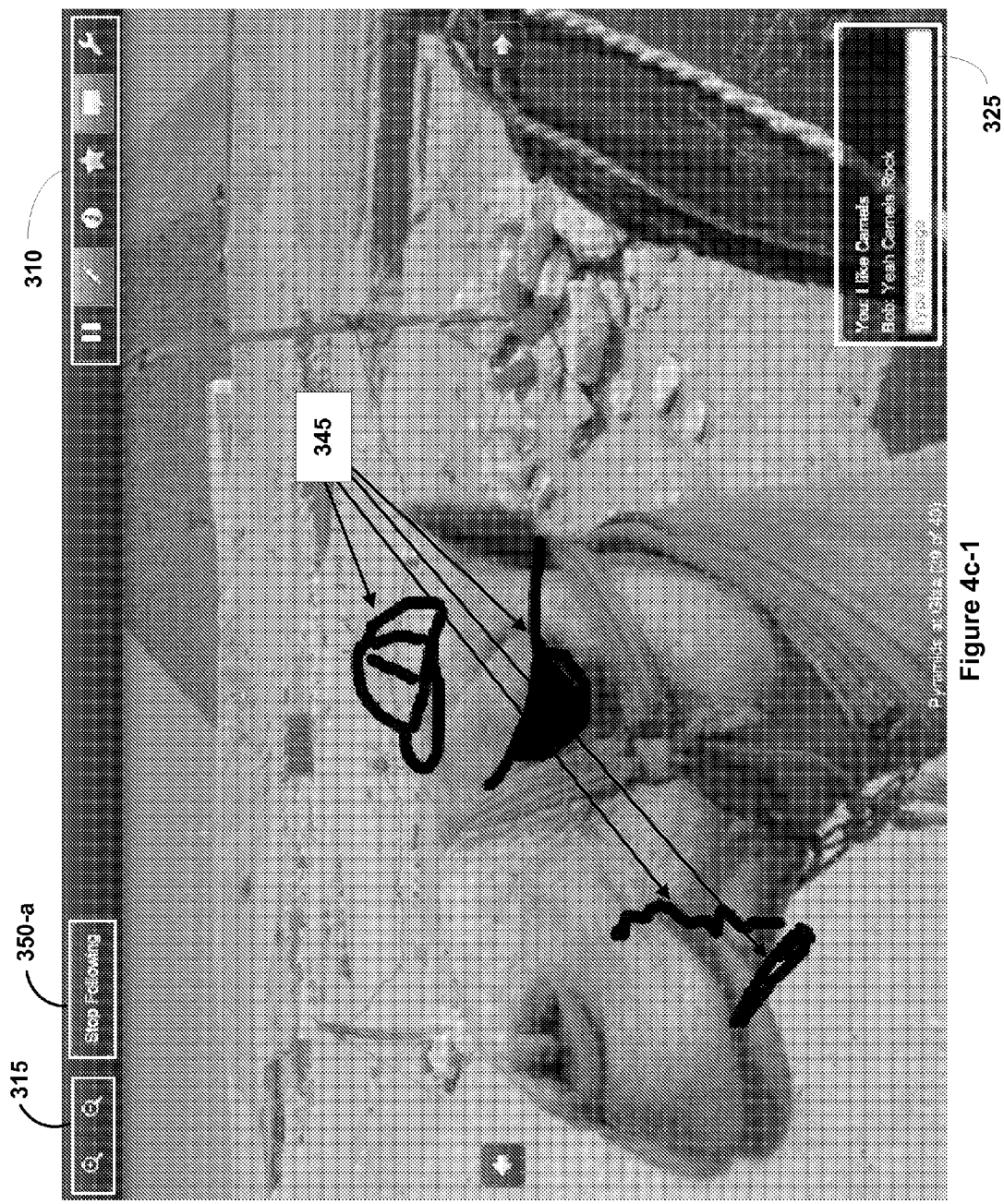
Figures 2, 4C:
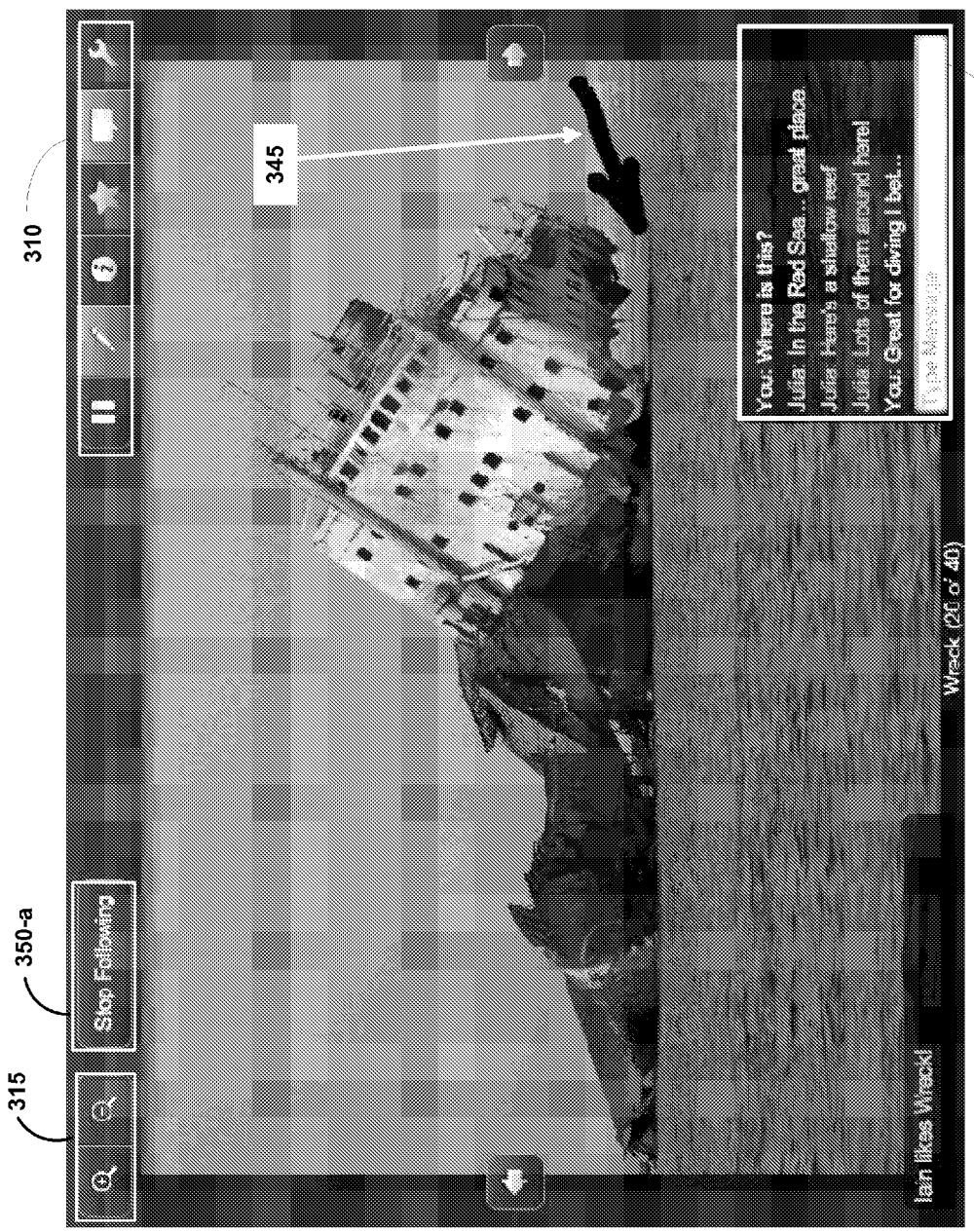

FIG. 4c illustrates an exemplary screen shot of a photo in the photo show wherein the image editing tool, such as a pencil tool, is used to draw on the photo. The edited information is captured as change and stored in a database and mapped to the photo and to particular portions of the photo so that the information can be extracted and shared by any of the users in the photo session. The edited information may be tagged to particular feature/content/location of the photo.

Figure 4D:
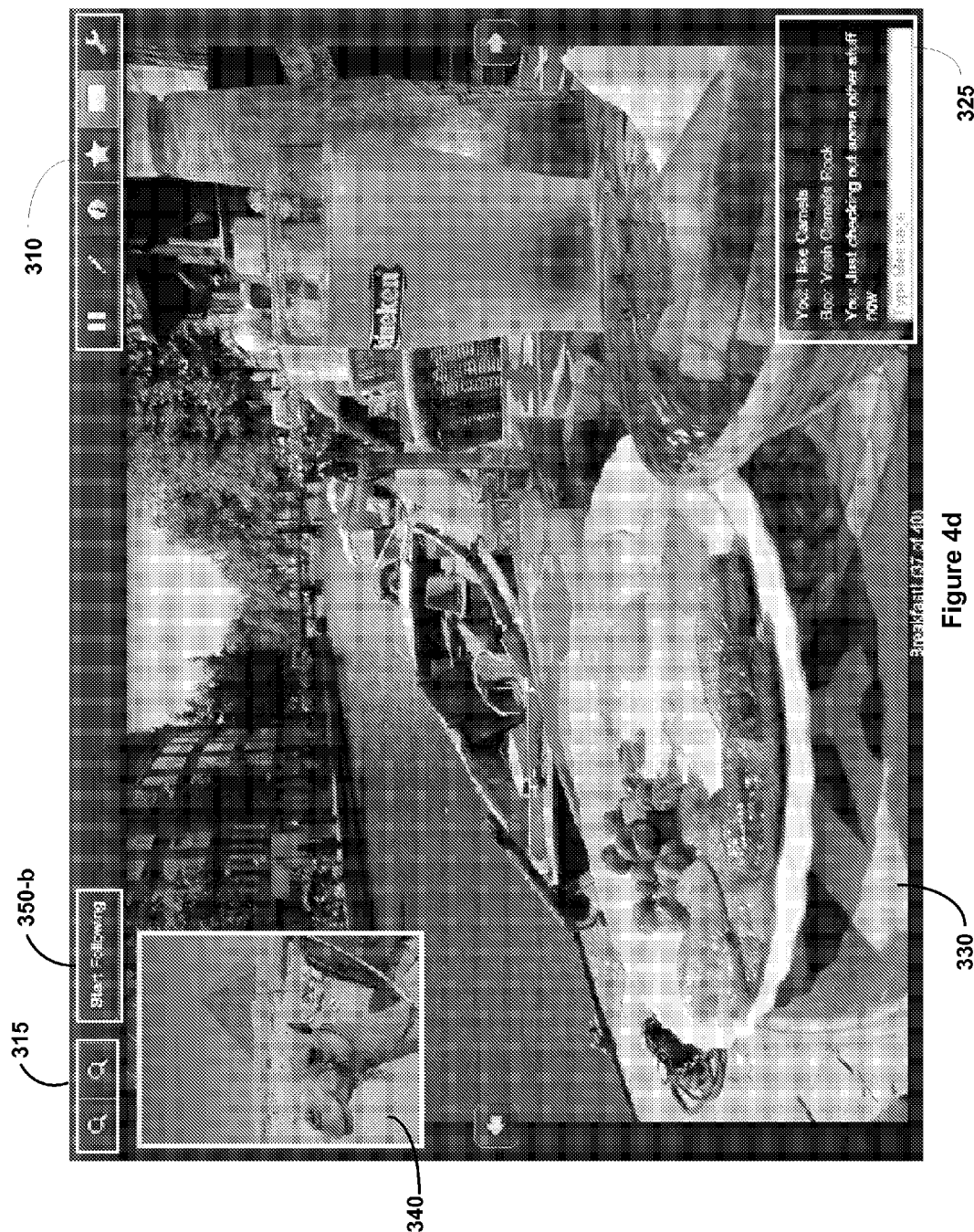
FIG. 4d illustrates an exemplary screen shot of a photo from a viewing user's display device during a spin-off from the online photo session, in one embodiment of the invention.

FIG. 4d illustrates an exemplary screen shot of a spin-off feature available to the users, in one embodiment of the invention. The algorithm provides the spin off option to enable a user to disconnect from the remaining users and browse the photos independently at the user's own pace. When the user selects the spin-off option by selecting the "Stop Following" button 350-a, the algorithm allows the user to select and view any previously viewed photo from the photo show. The user is said to have moved from a shared browsing to an independent browsing of photos within the photo show in the photo session. At this time, the algorithm may replace the "Stop Following" button 350-a with a "Start Following" button 350-b. Upon selection of a photo to view, the algorithm renders the selected photo in a main window 330 and an inset 340 to track what other users are currently viewing so as to let the user be aware what the rest of the users are currently viewing. For instance, the photo session that the users are viewing may contain 100 photos and the users may be viewing photo 35. A user (either a viewing or a sharing user) may want to view photo 12 in more detail. The user, at this time, initiates the stop following option, goes back to photo 12 and views the photo at his/her own pace. During the time it takes for the user to view photo 12 in detail, the other users may have advanced to photo 70. During the spin-off, the algorithm keeps the user aware of where the other users are in the photo session through the information provided in the inset. The user, upon completing viewing photo 12 and any other photos, rejoins the original session at the point where the rest of the users are currently. In this instance, based on the information provided in the inset, the user rejoins the other users at photo 70.

The main window 330 and the inset 340 are provided in a picture-in-picture format as illustrated in FIG. 4d. The user desiring to spin-off may be any one of the sharing or viewing user. This feature enables the users to view any one or a set of photos while being made aware of what the other users are watching during the time the user has spun off from the main photo show. Upon spinning off, when the user wants to rejoin the session, the user selects the "Start Following" option 350-b. When the user selects the "Start Following" option 350-b, the algorithm removes the inset 340 and replaces the photo in the main window 330 with the photo from the photo show that the other users are currently viewing based on the information provided in the inset. At this time, the algorithm replaces the "Start Following" option 350-b with "Stop Following" option. The algorithm provides the user with the ability to spin off from the photo show and to rejoin the photo show at any time during the photo session.

The algorithm also provides the ability to inform other users on the status of the specific users during the spin-off. In one embodiment, when the user selects the "Stop Following" option 350-a or the "Start Following" option 350-b, the algorithm detects the selection and may broadcast to the other users the status of the spin-off user. In another embodiment, the spin-off user may provide his/her status to the whole group in the message chat window 325, as illustrated in FIG. 4d.

In one embodiment, a user (i.e. sharing or viewing user) may fork off the online session into two sessions. The user may share the photo session with a first set of users and may branch off and start another photo session with the same set of photos with a second set of users. In one embodiment, the two session are done substantially simultaneously. The algorithm will recognize the spinning off of the two different sessions by the same user and will store the generated comments, annotations and message chats from the two sessions separately using the temporal, user, spatial and/or session attributes so that the information from each of the session can be separately retrieved and shared with other users in subsequent sessions.

The algorithm stores the generated information in each online photo session using the metadata. The metadata includes metadata associated with the set of photos and metadata associated with the generated information, such as comments, annotations, message chats, etc. In one embodiment, the algorithm may associate the metadata to the photos using tags. When a user's changes are to be published to the rest of the users in the photo session, the algorithm will take annotations, comments, etc., and re-publishes the photos with the annotations, comments, etc., using the tagged metadata. In one embodiment, the algorithm may use the metadata to re-publish only portions of the photos that are affected by the change (i.e. comments, annotations, etc.).

The algorithm also provides the ability for the viewing and sharing users to rate a photo in the photo show. The image editing tools includes a "Star" tool that allows the users to rate the photo. The rating is indicative of the popularity of the photo amongst all the photos with the viewing users in the photo session. The star feature may be used as a collaborative tool during the photo session. For instance, if a user stars a particular photo and a subsequent user also starts the same photo, then the particular photo is elevated to a higher rank based on the popularity amongst the users in the session. The algorithm compares a plurality of photos on the same subject based on the star rating of the respective photos and determines which of the photos are more popular amongst the users based on the star rating. For instance, this feature could be used in making a purchase, such as a prom dress or a wedding dress, etc.

With the above detailed description of the various features and options, a method for sharing documents, such as photos, in an online document sharing session will now be described with reference to FIG. 5. As previously mentioned, the embodiments of the invention are not restricted to photo sharing but can be extended to sharing of other documents, including document types, such as videos, wherein additional synchronized controls are made available. For example, users could be viewing a set comprised of both photos and videos. When a video is encountered during the online photo session, additional user interface (UI) controls that are relevant for controlling the video, such as play/pause/fast forward/rewind, etc., may be presented. Any user action using these controls will be synchronized with other users in the online photo session. For instance, when a sharing user fast forwards the video to a specific portion of the video or to a specific time in the video, the other users are also taken to that time/portion of the video. When a user (either sharing or viewing user) advances to a next item in the photo session and if the next item is not a video, then the video specific controls are removed from each user's display device.

Figure 5:
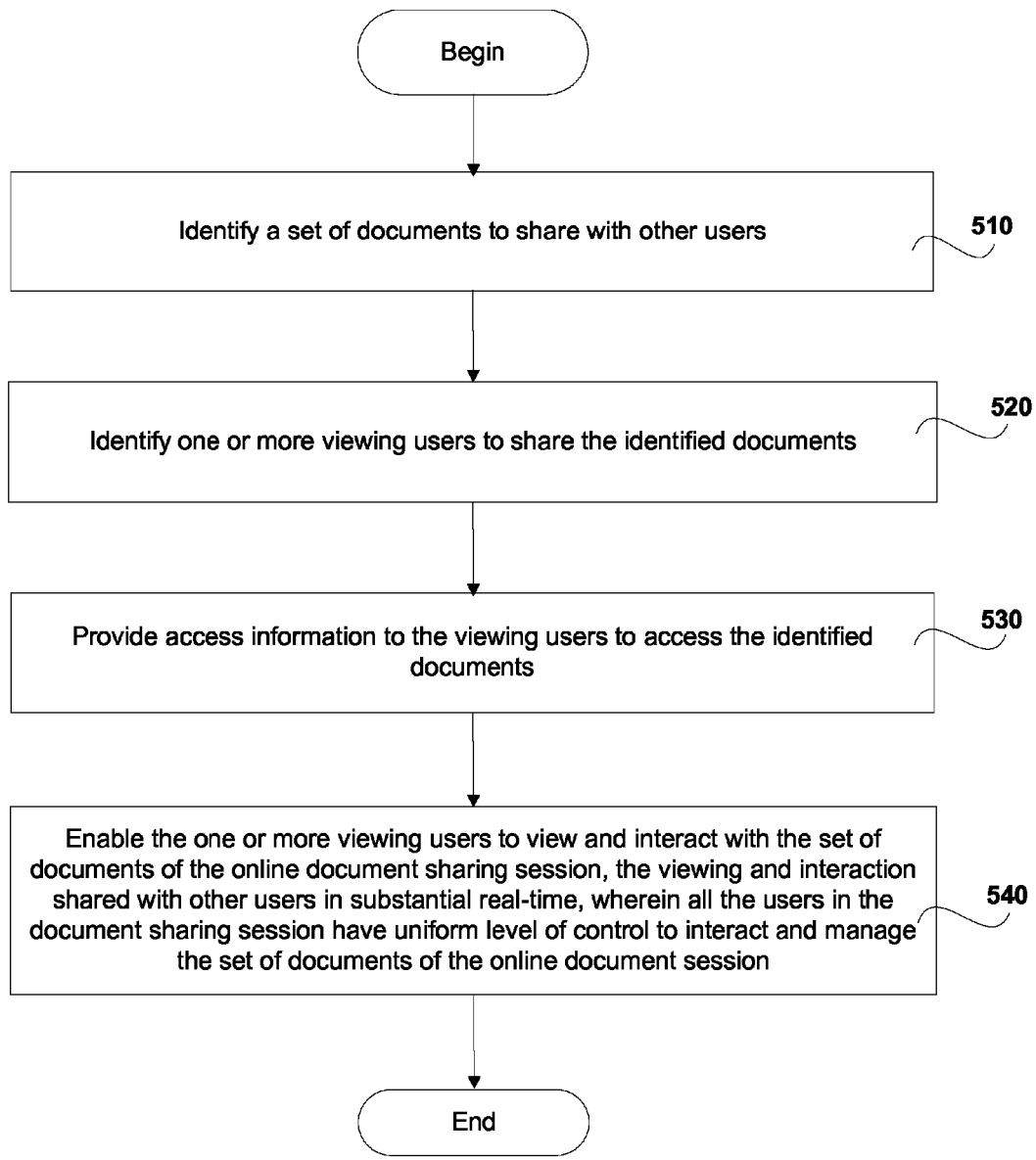
FIG. 5 illustrates a flow chart of operations used in sharing photos with other users in an online photo session, in one embodiment of the invention.

FIG. 5 illustrates one embodiment wherein sharing of documents is effectuated. The method beings with operation 510 where a set of documents are identified for sharing with a plurality of users. The set of documents may have been uploaded earlier by a sharing user and identified for sharing, the set of documents may have been uploaded by another user who shared the set of documents with the sharing user and the sharing user may now wish to share this set of documents with other users or the sharing user may use a "drag and drop" option to select photos and/or videos from the sharing user's own desktop, mobile or other computing device to share with other users. The selected photos/videos may be used to either generate a new photo session or add to an existing photo session. The sharing user also identifies one or more viewing users to share the identified set of documents, as illustrated in operation 520. Upon identifying the set of documents and the viewing users to share with, the sharing user provides access information to the viewing users in order to access the identified documents, as illustrated in operation 530. The access information may include sharing attributes that distinctly identify the set of documents and generated information identifying history of comments, annotations, message chats, etc., associated with the set of documents that the sharing user wishes to share with the identified viewing users. The generated information may have been stored in a history database with user attributes, temporal attributes, spatial attributes and/or session attributes related to previous online document sharing sessions. Based on the access information, the viewing users are presented with appropriate set of documents and generated information. The method ends at operation 340, wherein the presented information related to the identified set of documents enables the viewing users and the sharing user to view and interact with the set of online documents. The viewing users have the same level of control as the sharing users to view and interact with the set of documents presented during the online document sharing session. Any changes to the documents generated through the interactions by the viewing users during the online document sharing session are shared with other users that have access to the online document sharing session in substantial real-time.

Figure 6:
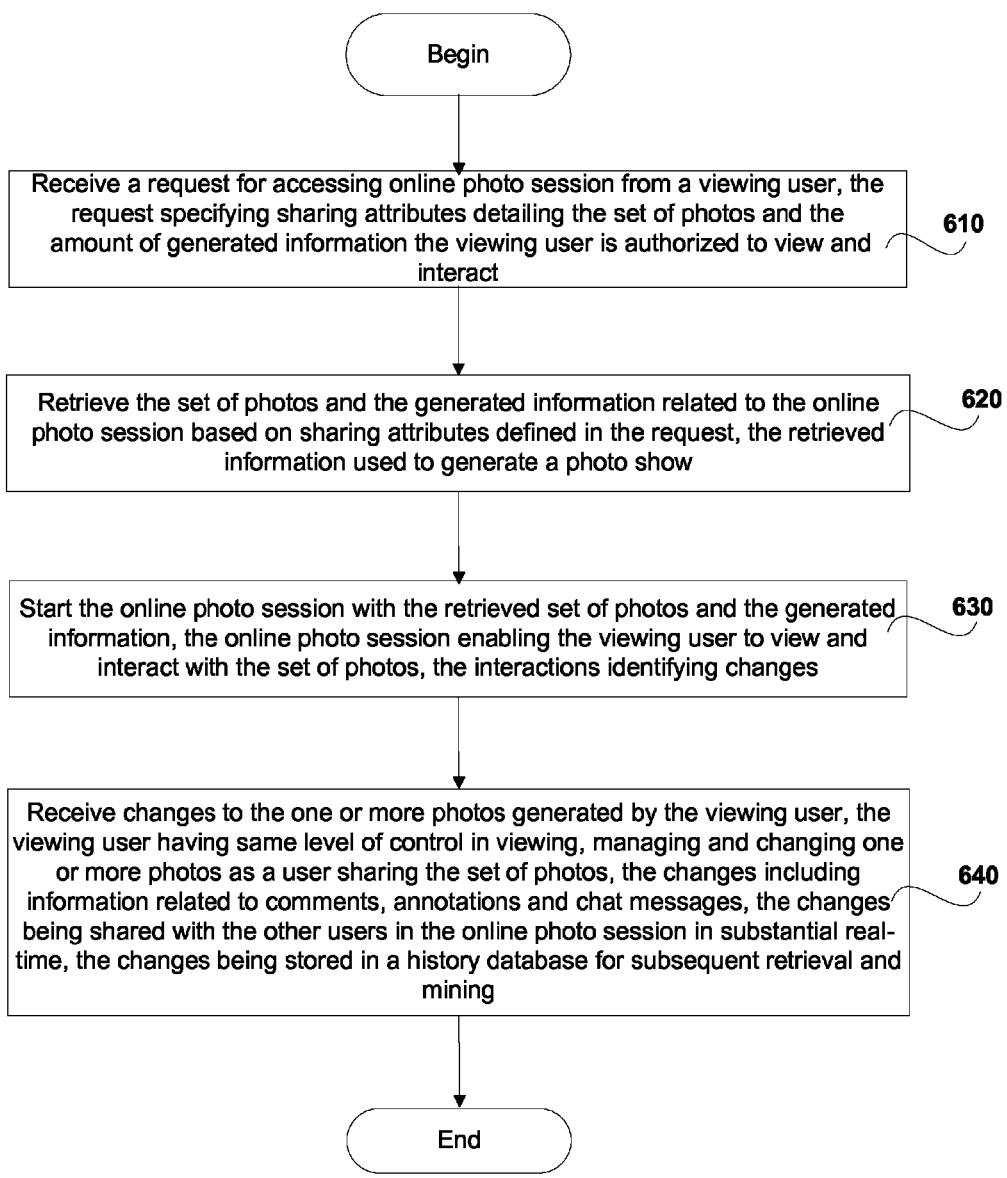
FIG. 6 illustrates a flow chart of operations used in sharing photos with other users in an online photo session, in an alternate embodiment of the invention.

FIG. 6 illustrates a specific embodiment of the online document sharing method discussed with reference to FIG. 5. In this embodiment, as with other embodiments that are discussed in this application, the method relates to sharing a set of photos with other users during an online photo session. The method begins with operation 610 wherein a request for accessing an online photo session is received from a viewing user. The viewing user may have been provided a link to the online photo session by a sharing user who wishes to share the photos in the online photo session with the viewing users. The link may have been provided through an email, an SMS text, in instant message chat, via telephone, or by other means. The request identifies sharing attributes that specify the set of photos and additional information related to comments, annotations, message chats, etc., that was generated during previous online photo sessions that the viewing user is authorized to view and interact. In one embodiment, the request may also specify the user attributes that are required to access the set of photos and generated information. For instance, the user attributes may include one or more authentication credentials required from the viewing user prior to being allowed to access the set of photos. The user authentication may be required based on the sensitivity of the photos being shared.

Upon authentication of the user, the identified set of photos and the generated information are retrieved based on the sharing attributes specified in the request and a photo show is generated, as illustrated in operation 620. The set of photos may be retrieved from a photo database and the relevant generated information may be retrieved from a history database and the photo show may be generated by overlaying the generated information over the set of photos. The online photo session is started with the generated photo show. The generated photo show is rendered at a display device associated with the viewing user in response to the request. The photo session enables the viewing user to view and interact with the set of photos at the same level as a user who is sharing the photos in the online photo session, wherein the interactions identify changes to the one or more photos provided by the viewing users, as illustrated in operation 630. The process concludes with operation 640 wherein the changes to the one or more photos generated by the viewing user are received and shared with other users in the online photo session in substantial real-time. The changes are stored in a history database for subsequent retrieval and mining using one or more of session attributes, user attributes, spatial attributes and temporal attributes. The process of receiving a request to view a photo session and providing changes to the photo session may continue so long as the viewing user is interested in viewing and interacting with the photos.

As can be seen, the embodiments of the invention provide an algorithm within a sharing application that provides great flexibility to the viewing users during online document sharing session by allowing equal level of control to view, manage, change any of the documents in the online document sharing session as the user that is sharing the documents. Such flexibility enhances the viewing user's interest in participating in such sessions making this a much more compatible tool than the conventional applications. It should be noted herein that the online photo session sharing algorithm are configured to be embeddable such that it can be used within the context of other sites or applications. For instance, the algorithm may be included in partner web sites that are hosted on different environments, for example, in the case of syndication deals. Other advantages of the algorithm may be easily envisioned by one skilled in the art.

It will be obvious, however, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for sharing photos with other users in an online photo session, comprising:
   identifying a set of photos to share with viewing users from a photo-sharing website, the set of photos having been uploaded and stored on the photo-sharing website by a sharing user, the identified set of photos used to generate a photo show for sharing in the online photo session;
   selecting one or more viewing users for sharing the set of photos;
   providing access information to the viewing users for accessing the photo show with the identified set of photos; and
   enabling the one or more viewing users to view and interact with the set of photos in the photo show of the online photo session in a shared browsing, the viewing and interaction being propagated to all the viewing users and the sharing user in substantial real-time so as to provide a synchronized view of the photo show to the viewing and sharing users in the photo session,
   wherein the one or more viewing users and the sharing user have uniform level of control to interact with and manage the set of photos of the online photo session in the shared browsing, upon access, wherein the interaction includes,
   pausing the photo show in response to initiation of an interaction by one of a specific viewing user or the sharing user, wherein the pausing is done automatically by an application executing an algorithm used for sharing photos or explicitly by a user initiating the interaction;
   receiving a change to the photo, wherein the change includes any one or a combination of annotation, comment or instant message chat related to the photo and directed toward the one or more viewing and sharing users, the instant message chat between the sharing and viewing users during the online photo session enabled through a lightweight built-in message system; and
   re-loading the photo with the change in substantial real-time, the re-loading enabling the viewing and sharing users with access to the online photo session to view the change during the photo show.

2. The method of claim 1, wherein providing access information includes sharing a uniform resource locator (URL) to the photo-sharing website for accessing the selected set of photos.

3. The method of claim 2, wherein the providing further includes requesting user credentials to access the online photo session at the photo-sharing website, the user credentials used to authenticate the viewing users so as to provide secure access to the set of photos.

4. The method of claim 1, wherein providing further includes,
   a. scheduling a meeting time for the online photo session; and
   b. generating an event entry in an online calendar tool associated with each of the viewing users.

5. The method of claim 1, further includes,
   generating a tag for the change; and mapping the tag associated with the change to any one of the photo, a specific content of the photo, a specific feature of the photo or a specific portion of the photo in the set of photos, wherein the re-loading includes re-loading any one of the photo with the change, the specific content of the photo with the change, the specific feature of the photo with the change or the specific portion of the photo with the change.

6. The method of claim 1, further includes, identifying metadata associated with the change;

tagging the metadata to the photo; and storing the metadata related to the change in a database on a server using one or combination of temporal, session, spatial or user attributes, for subsequent retrieval and analysis.

7. The method of claim 1, further includes resuming the photo show of the online photo session, the resumption of the photo show initiated by any one of the viewing or sharing users having access to the online photo session.

8. The method of claim 1, further includes, inviting a second set of viewing users that are distinct from the viewing users to share the set of photos during the online photo session by a sharing user, the invitation allowing the second set of viewing users to view the set of photos and any historical information related to the annotations, comments and message chats generated by the viewing and sharing users of the online photo session in shared browsing, wherein the second set of viewing users generate annotations, comments and message chats that are shared with the viewing and sharing users of the online photo session.

9. The method of claim 1, further includes, extending an invitation to a second set of viewing users to share the set of photos of the online photo session, the invitation extended by any one of the sharing or viewing users from prior online photo sessions associated with the set of photos;

retrieving the set of photos and any generated information history related to the online photo session from a database based on sharing attributes defined in the invitation, the sharing attributes defining amount of generated information history that a user extending the invitation is willing to share with the second set of viewing users, the sharing attributes distinctly identifying one or more of temporal attributes, session attributes, spatial attributes or user attributes associated with the stored online photo session and the generated information history, wherein the database is a repository of information related to the online photo sessions including history of generated information; and restarting the online photo session, the restarting enabling the second set of users to view the set of photos and any generated information retrieved from the database and to interact with the set of photos in the shared browsing to generate comments, annotations and chat messages related to one or more photos in the online photo session.

10. The method of claim 9, further includes, sending an alert to prior viewing and sharing users of the restarted photo session related to the set of photos upon generation of a comment, an annotation or a message chats by any one of the second set of viewing users.

11. The method of claim 9, further includes storing the comments, annotations and chat messages generated by the second set of viewing users using any one or combination of session attributes, user attributes, spatial attributes or temporal attributes in the database for subsequent mining and analysis.

12. The method of claim 9, wherein retrieving further includes, presenting a list of online photo sessions with corresponding session, user, spatial and temporal attributes for the set of photos identified for sharing;

identifying the photo session and generated information history based on the sharing attributes specified in the invitation;

extracting the identified photo session and the generated information history from the database; and rendering the retrieved photo session and the generated information history for sharing with the second set of viewing users.

13. The method of claim 1, further includes rating the photos in the online photo session, the rating enabling ranking of the photos to declare popularity of the photos in the online photo session.

14. The method of claim 1, further includes initiating a spin off from the online photo session by any one of the viewing or sharing users, the spin off allowing the sharing or viewing user to move from the shared browsing to an independent browsing for viewing the set of photos in the online photo show, wherein the independent browsing allows the sharing or viewing user to disconnect from the shared browsing of the photos of the online photo show with the sharing or other viewing users and browse the photos of the online photo show independently at the sharing or viewing user's own pace.

15. The method of claim 14, wherein spin off further includes, selecting a photo for viewing in the independent browsing;

rendering the selected photo from the independent browsing in a main window of a rendering device associated with the sharing or viewing user initiating the spin off; and rendering photos from the photo show associated with the shared browsing in an auxiliary window, the auxiliary window displaying current status of the photo show in the online photo session for the shared browsing as shared by the other viewing and sharing users.

16. A computer program embedded in a non-transitory computer-readable storage medium configured to be executed by one or more processors, for sharing photos in an online photo session, the computer program comprising:

program instructions for identifying a set of photos to share with viewing users from a photo-sharing website, the set of photos having been uploaded and stored on the photo-sharing website by a sharing user, program instructions for identifying further includes program instructions for generating a photo show with the identified set of photos for sharing in the online photo session;

program instructions for selecting one or more viewing users for sharing the set of photos;

program instructions for providing access information to the viewing users for accessing the photo show with the identified set of photos; and program instructions for enabling the one or more viewing users to view and interact with the set of photos of the online photo session in shared browsing, the viewing and interaction being propagated to all the viewing users and the sharing user in substantial real-time so as to provide a synchronized view of the photo show to the viewing and sharing users in the photo session, wherein the one or more viewing users and the sharing user have uniform level of control to interact with and manage the set of photos of the online photo session in the shared browsing, upon access and wherein the interaction includes, pausing the photo show in response to the interaction initiated by the viewing user, wherein the pausing is done automatically by an application executing an algorithm used for sharing the set of photos or explicitly by the viewing user;

providing a change to the photo, wherein the change includes any one or a combination of annotation, comment or message chat related to the photo and directed toward a sharing user or other viewing users participating in the photo session, the change resulting in re-loading of the photo with the change in substantial real-time to enable the other viewing and sharing users with access to the online photo session to view the change during the photo show, wherein the instant message chat during the online photo session enabled through a lightweight built-in message system.

17. A method for sharing photos with other users in an online photo session, comprising:

receiving a request for accessing the online photo session from a viewing user, the access request specifying sharing attributes associated with a shared browsing of the online photo session, the sharing attributes detailing amount of generated information history associated with the online photo session that the viewing user is authorized to view and share;

retrieving the set of photos and any generated information history related to the online photo session from a database based on sharing attributes defined in the request, the retrieved information used to generate a photo show, the sharing attributes distinctly identifying one or more of temporal attributes, session attributes, spatial attributes or user attributes associated with the stored online photo session and the generated information history, wherein the database is a repository of information related to the online photo sessions including generated information history; and starting the shared browsing of the online photo session, the starting enables the viewing user to view and interact with the set of photos to generate comments, annotations and chat messages related to one or more photos in the online photo session, wherein the viewing and interaction provides the viewing user with a synchronized view of the photo show within the shared browsing of the photo session, wherein the interaction includes, pausing the photo show in response to the interaction initiated by the viewing user, wherein the pausing is done automatically by an application executing an algorithm used for sharing the set of photos or explicitly by the viewing user;

providing a change to a photo, wherein the change includes any one or a combination of annotation, comment or message chat related to the photo and directed toward a sharing user or other viewing users participating in the photo session, the change resulting in re-loading of the photo with the change in substantial real-time to enable the other viewing and sharing users with access to the online photo session to view the change during the photo show, wherein the instant message chat during the online photo session enabled through a lightweight built-in message system.

18. The method of claim 17, further includes resuming the photo show of the online photo session, the resumption initiated by any one of the viewing or sharing users having access to the online photo session.

19. The method of claim 17, further includes initiating a spin off from the online photo session by the viewing user, wherein the spin off allows the viewing user to move from the shared browsing to an independent browsing for viewing the set of photos in the online photo show, wherein the independent browsing allows the viewing user to disconnect from the shared browsing of the photos of the online photo show with the other viewing and sharing users and browse the photos of the online photo show independently at the viewing user's own pace.

20. A system for sharing documents in an online document view session, comprising:

a client device with an interface configured to,
  a) upload one or more documents to a document sharing website;
  b) render a document show within an online document view session that includes the uploaded set of documents;
  c) include controls to select one or more viewing users to share the set of documents in the created online document view session;
  d) receive access information for accessing the identified set of documents, wherein the access information identifying sharing attributes specified by a sharing user;
  e) receive interactions from a viewing or sharing user at any one of the set of documents during rendering of the document show in a shared browsing, wherein the interactions include changes to the documents including any one or combination of annotations, comments, or instant message chats generated by the viewing or sharing users, wherein receiving interactions include,
    e1) pausing the document show in response to interactions received from the viewing or sharing user;
    e2) receiving the changes to the documents, wherein the changes related to the documents are directed toward the one or more viewing and sharing users, the instant message chat between the sharing and viewing users enabled through a lightweight built-in message system; and
    e3) re-loading the documents with the changes in substantial real-time, the re-loading enabling the viewing and sharing users with access to the online document view session to view the changes during the document show; and a server device for executing an application for sharing the documents with other users in the online document view session, the application including a sharing algorithm that is configured to,
  f) receive the uploaded set of documents and store with one or more of session attributes, spatial attributes, user attributes and temporal attributes;
  g) generate the document show for the set of documents in the shared browsing mode for sharing with the viewing users, the document show generated in accordance to the access information specified by the sharing user, the generated document show enabled for shared browsing so as to provide a synchronized view of the photo show to the viewing and sharing users in the online document view session; and
  h) gather and store information generated from the interactions including the comments, annotations and instant message chat in a history database, the generated interaction information used in subsequent mining and analysis.

21. The system of claim 20, wherein the client device further includes a set of editing tools for the viewing and sharing users to use during the interaction, wherein the set of editing tools includes any one or more of text editing tools, image editing tools and one or more native editing tools from one or more applications and one or more control tools to control the online document view session based on the type of documents being viewed in the photo session.

22. The system of claim 20, wherein the client device further includes an event scheduler interface to an online calendar tool so as to schedule a meeting for the online document view session and for generating an event entry in the online calendar tool.

* * * * *